US008521362B2

(12) United States Patent
Miyajima et al.

(10) Patent No.: US 8,521,362 B2
(45) Date of Patent: Aug. 27, 2013

(54) VEHICLE STABILIZER CONTROL DEVICES, METHODS, AND PROGRAMS

(75) Inventors: Takayuki Miyajima, Anjo (JP); Seiji Hidaka, Toyota (JP); Hirofumi Nitta, Obu (JP)

(73) Assignees: Aisin AW Co., Ltd., Anjo (JP); Aisin Seiki Kabushiki Kaisha, Kariya (JP)

( * ) Notice: Subject to any disclaimer, the term of this patent is extended or adjusted under 35 U.S.C. 154(b) by 838 days.

(21) Appl. No.: 12/232,988

(22) Filed: Sep. 26, 2008

(65) Prior Publication Data
US 2009/0112401 A1 Apr. 30, 2009

(30) Foreign Application Priority Data
Sep. 26, 2007 (JP) ................. 2007-248589

(51) Int. Cl.
*B60G 17/016* (2006.01)
*B60G 23/00* (2006.01)
*B62C 3/00* (2006.01)
*B62K 25/00* (2006.01)
*G06F 7/00* (2006.01)
*G06F 17/00* (2006.01)
*G06F 19/00* (2011.01)

(52) U.S. Cl.
USPC ............ 701/38; 701/36; 701/37; 701/70; 701/72; 701/465; 280/5.506; 280/5.507; 280/5.512; 280/5.515; 303/177; 180/282

(58) Field of Classification Search
USPC ........... 701/38, 70, 72, 75, 79, 40, 41, 43, 701/44, 73, 71, 465; 280/5.511, 5.5, 5.501, 280/5.502, 5.506, 5.507, 5.508, 5.51, 5.512, 280/3, 5.514, 5.515; 303/177, 181, 183, 303/184; 180/271, 282
See application file for complete search history.

(56) References Cited

U.S. PATENT DOCUMENTS

| 5,315,295 | A   | * | 5/1994  | Fujii ........................... 340/936 |
| 6,208,927 | B1  | * | 3/2001  | Mine et al. ..................... 701/70 |
| 7,118,184 | B2  | * | 10/2006 | Harada et al. ................ 303/146 |
| 7,540,351 | B2  | * | 6/2009  | Kataoka et al. .............. 180/446 |
| 7,734,404 | B2  | * | 6/2010  | Shiiba et al. .................... 701/70 |
| 7,765,048 | B2  | * | 7/2010  | Suzuki et al. .................. 701/70 |
| 2005/0192728 | A1 |   | 9/2005 | Yasui et al. |
| 2009/0091093 | A1 | * | 4/2009 | Urababa et al. ............ 280/5.511 |

FOREIGN PATENT DOCUMENTS
EP 1 541 389 A2 6/2005
(Continued)

OTHER PUBLICATIONS

Japanese Patent Office, Notification of Reason for Refusal mailed Nov. 8, 2011 in Japanese Patent Application No. 2007-248589 w/Partial English-language Translation.

*Primary Examiner* — Thomas H Tarcza
*Assistant Examiner* — Rami Khatib
(74) *Attorney, Agent, or Firm* — Oliff & Berridge, PLC

(57) ABSTRACT

Stabilizer control devices, methods, and programs obtain information indicating lateral acceleration operating on the vehicle and obtain information indicating a curve section existing in a traveling direction of the vehicle. The devices, methods, and programs control roll stiffness by a stabilizer mounted on the vehicle based on the obtained lateral acceleration information by setting a lateral acceleration threshold at a first value in the curve section and a second value in a section other than the curve section respectively, the first value being smaller than the second value. The devices, methods, and programs control the roll stiffness when the lateral acceleration is equal to or larger than the lateral acceleration.

12 Claims, 3 Drawing Sheets

(56) References Cited

FOREIGN PATENT DOCUMENTS

| | | |
|---|---|---|
| EP | 1 568 521 A2 | 8/2005 |
| JP | A-04-163220 | 6/1992 |
| JP | A-2004-291942 | 10/2004 |
| JP | A-2005-088834 | 4/2005 |
| JP | A-2006-347406 | 12/2006 |
| JP | A-2007-237917 | 9/2007 |
| WO | WO 02/053398 A1 | 7/2002 |
| WO | WO 2006/134954 A2 | 12/2006 |

* cited by examiner

VEHICLE STABILIZER CONTROL DEVICES, METHODS, AND PROGRAMS

INCORPORATION BY REFERENCE

The disclosure of Japanese Patent Application No. 2007-248589 filed on Sep. 26, 2007 including the specification, drawings and abstract is incorporated herein by reference in its entirety.

BACKGROUND

1. Related Technical Fields

Related technical fields include stabilizer control devices, methods, and programs that control a stabilizer mounted on a vehicle.

2. Related Art

Known technology controls a stabilizer according to detection values from sensors mounted in a vehicle. For example, a known technology detects lateral acceleration of a vehicle by various sensors mounted in the vehicle, and uses a stabilizer to changes the degree of control of roll stiffness according to the detected lateral acceleration (see, for example, Japanese Patent Application Publication No. JP-A-2006-347406).

SUMMARY

In the known technology, control of the roll stiffness is implemented according to the lateral acceleration when the detected lateral acceleration exceeds a certain threshold. Because control to increase the roll stiffness is not implemented until the certain threshold is exceeded, when there is a relatively small lateral acceleration while traveling in a curve section, rolling of the vehicle cannot be suppressed appropriately even though the roll stiffness should be controlled.

Exemplary implementations provide devices, methods, and programs that are capable of controlling the roll stiffness appropriately in a section where the roll stiffness should be controlled.

Exemplary implementations provide stabilizer control devices, methods, and programs that obtain information indicating lateral acceleration operating on the vehicle and obtain information indicating a curve section existing in a traveling direction of the vehicle. The devices, methods, and programs control roll stiffness by a stabilizer mounted on the vehicle based on the obtained lateral acceleration information by setting a lateral acceleration threshold at a first value in the curve section and a second value in a section other than the curve section respectively, the first value being smaller than the second value. The devices, methods, and programs control the roll stiffness when the lateral acceleration is equal to or larger than the lateral acceleration.

DETAILED DESCRIPTION OF EXEMPLARY IMPLEMENTATIONS

Figure 1:
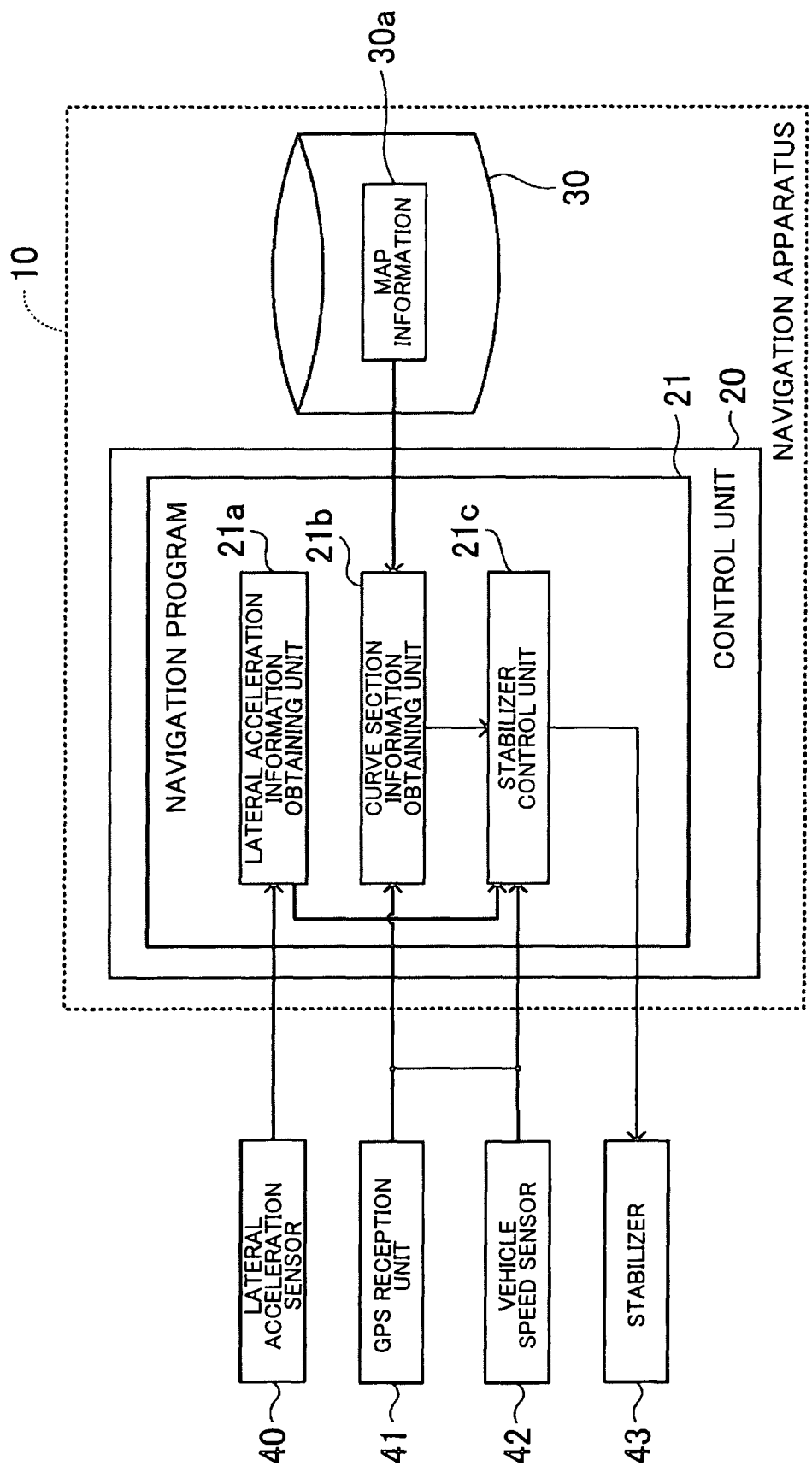
FIG. 1 is a block diagram of an exemplary navigation apparatus including a stabilizer control device.

FIG. 1 is a block diagram showing a structure of a navigation apparatus 10 including a stabilizer control device. The navigation apparatus 10 includes a controller (e.g., control unit 20) having a CPU, a RAM, a ROM, and so on, and a storage medium 30. A program stored in the storage medium 30 or the ROM can be executed by the control unit 20. In this example, as a navigation program 21 can be executed by the control unit 20, and the navigation program 21 includes, as one of its functions, a function to control roll stiffness by a stabilizer.

A vehicle in this example (vehicle in which the navigation apparatus 10 is mounted) includes a lateral acceleration sensor 40, a GPS reception unit 41, a vehicle speed sensor 42, and a stabilizer 43 for realizing the function by the navigation program 21. By cooperation of these parts and the control unit 20, the function by the navigation program 21 is realized.

The lateral acceleration sensor 40 outputs a signal corresponding to the amount of acceleration operating on the vehicle (having a component in a direction parallel to a lateral direction of the vehicle). The control unit 20 obtains this signal via an interface, and obtains the amount of lateral acceleration operating on the vehicle. The GPS reception unit 41 receives a radio wave from a GPS satellite, and outputs information for calculating the current position of the vehicle. The control unit 20 obtains this signal to obtain the current position of the vehicle.

The vehicle speed sensor 42 outputs a signal corresponding to rotation speed of wheels provided on the vehicle. The control unit 20 obtains this signal to determine the speed of the vehicle. The vehicle speed sensor 42 is used for obtaining information indicating the speed of the vehicle, and also used for correcting the current position of the vehicle identified from the output signal of the GPS reception unit 41.

The arrangement for obtaining the current position of the vehicle is naturally not limited to the above arrangement. An arrangement to obtain the current position based on behavior of the vehicle identified by a gyro sensor, a steering sensor, or the like may be adopted. An arrangement to correct the current position based on an output signal from the vehicle speed sensor, the gyro sensor, or the like or a trace of the vehicle may be adopted. Note that as the arrangement for obtaining information indicating behavior of the vehicle, other various kinds of arrangements can be adopted. An arrangement to identify the current location of the vehicle by a sensor and/or a camera, an arrangement to obtain the information indicating behavior of the vehicle by signal from GPS, a trace of the vehicle on a map, inter-vehicle communication, road-vehicle communication, or the like can be adopted.

The stabilizer 43 is a mechanism including substantially rod shape members mounted on the vehicle to suppress rolling of the vehicle, and is capable of controlling the roll stiffness of the vehicle by a control signal outputted by the control unit 20. Specifically, in this example, substantially rod shape members provided between left and right wheels of the vehicle in a front part and a rear part of the vehicle respectively are coupled to an actuator at a center of the vehicle. By the control signal outputted by the control unit 20, a state of tolerating relative rotation in the left and right rod shape members and a state of suppressing the relative rotation is determined, and the degree of suppressing the relative rotation can be controlled.

By executing the navigation program 21, the control unit 20 performs route search or the like for the vehicle based on output information from the GPS reception unit 41, map information (described later), or the like, and performs route guidance or the like via a display unit or a speaker. Here, at this time, in a curve section, a smaller threshold than in a section other than the curve section is set for the acceleration in a lateral direction, and control of the roll stiffness is started when the acceleration in a lateral direction is equal to or larger than the threshold. For this purpose, the navigation program 21 includes a lateral acceleration information obtaining unit 21a, a curve section information obtaining unit 21b, and a stabilizer control unit 21c.

Further, in the storage medium 30, map information 30a for implementing guidance by the navigation program 21 is stored. The map information 30a includes node data indicating nodes set on the road on which the vehicle is traveling, shape interpolation point data for identifying the shape of the road between nodes, link data indicating coupling of nodes to each other, data indicating features existing on and in the vicinity of the road, information indicating curve sections (data indicating start positions and end positions of curve sections), and so on, and is used for identifying the current position of the vehicle, guiding to a destination, identifying a curve section, and the like.

The lateral acceleration information obtaining unit 21a is a module obtaining a signal corresponding to the lateral acceleration outputted by the lateral acceleration sensor 40. The lateral acceleration information obtaining unit 21a transfers information indicating the lateral acceleration to the stabilizer control unit 21c. The curve section information obtaining unit 21b is a module obtaining the map information 30a by referring to the storage medium 30, and extracts information regarding the road in a traveling direction of the vehicle from information recorded in the map information 30a and identifies the start position and the end position of the curve section ahead of the vehicle. Information indicating the start position and the end position of the curve section is transferred to the stabilizer control unit 21c.

The stabilizer control unit 21c is a module controlling the stabilizer 43 based on the information indicating the lateral acceleration and information indicating the start position and the end position of a curve section. Specifically, when the lateral acceleration is equal to or larger than a predetermined threshold, the stabilizer control unit 21c outputs to the stabilizer 43 a control signal to vary the roll stiffness of the stabilizer 43 according to the lateral acceleration. For example, when the lateral acceleration is equal to or larger than the threshold, the unit outputs a control signal to control the stabilizer 43 so that the roll stiffness becomes higher as the lateral acceleration gets larger. As a result, the stabilizer 43 generates, in an actuator, force to suppress relative rotation of the left and right rod shape members according to the magnitude of the lateral acceleration, thereby realizing the roll stiffness capable of suppressing rolling of the vehicle.

Further, in this example, the stabilizer control unit 21c can change the threshold depending on the section of the road where the vehicle is traveling, and set the threshold so that the threshold becomes Ac in a curve section and the threshold becomes A1 in a section other than a curve section. Here, the threshold Ac is less than the threshold A1. In a curve section, the lateral acceleration that triggers the start the control of the roll stiffness is smaller than in a section other than a curve section. Conversely, in a section other than a curve section, the lateral acceleration that triggers the start of the control of the roll stiffness is larger than in a curve section.

Here, for setting the threshold, the stabilizer control unit 21c in this example obtains the above-described start position of a curve section, obtains a predicted arrival time to arrive at the start position of the curve section based on the vehicle speed the current position of the vehicle, and sets the threshold value to start the control of the roll stiffness to Ac when the predicted arrival time is not longer than a predetermined threshold T. Specifically, the threshold regarding the lateral acceleration is set to Ac before the curve section, and roll stiffness control with high sensitivity is implemented precisely in the curve section.

Further, in this example, to implement appropriate roll stiffness control in each curve section when curve sections continue at short intervals, the threshold may remain Ac in the straight section between continuous curve sections. Specifically, the stabilizer control unit 21c obtains information regarding all the curve sections within a predetermined range ahead of the vehicle, and obtains, when curve sections continue, the distance between the end position of a nearer curve section and the start position of a farther curve section. When the distance is not longer than a predetermined distance, the threshold remains Ac through the straight section.

Next, an exemplary stabilizer control method will be explained with reference to FIG. 2. The exemplary method may be implemented, for example, by one or more components of the above-described navigation apparatus. For example, the exemplary method may be implemented by the control unit 20 executing a computer program (e.g., navigation program 20) stored in the storage medium 30 or the ROM. However, even though the exemplary structure of the above-described navigation apparatus may be referenced in the description, it should be appreciated that the structure is exemplary and the exemplary method need not be limited by any of the above-described exemplary structure.

When the navigation program 21 is executed by the navigation apparatus 10, the navigation program 21 is performing guide processing of a route or the like to the driver of the vehicle. In the course of this processing, in this example, so-called map matching processing is performed.

The map matching processing is processing to assume that, when the traveling trace of the vehicle matches with a sequence of nodes and/or shape interpolation points, the vehicle is traveling on the road indicated by the nodes and/or the shape interpolation points. Conversely, when the vehicle is matching with the sequence of the nodes and/or the shape interpolation points by this map matching processing, it can be assumed that the vehicle is traveling on the road.

Figure 2:
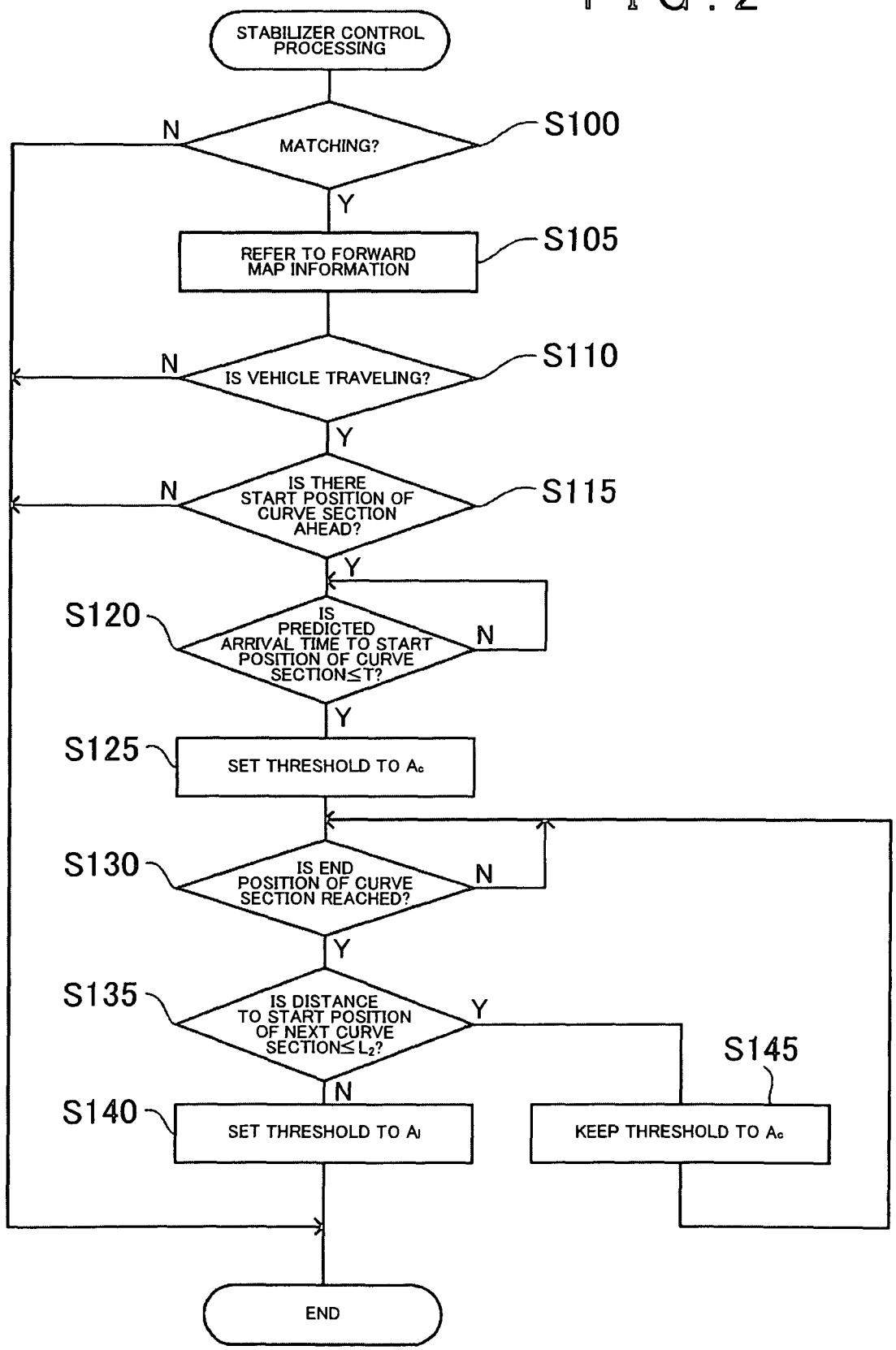
FIG. 2 is a flowchart of an exemplary stabilizer control method.

When the guide processing or the map matching processing as above is executed, the units included in the navigation program 21 execute stabilizer control processing shown in FIG. 2 at every predetermined time (for example, 100 ms). In this processing, in a section other than a curve section (except a section between continuous curve sections), the threshold to start the control of the roll stiffness is set to A1.

Figure 3:
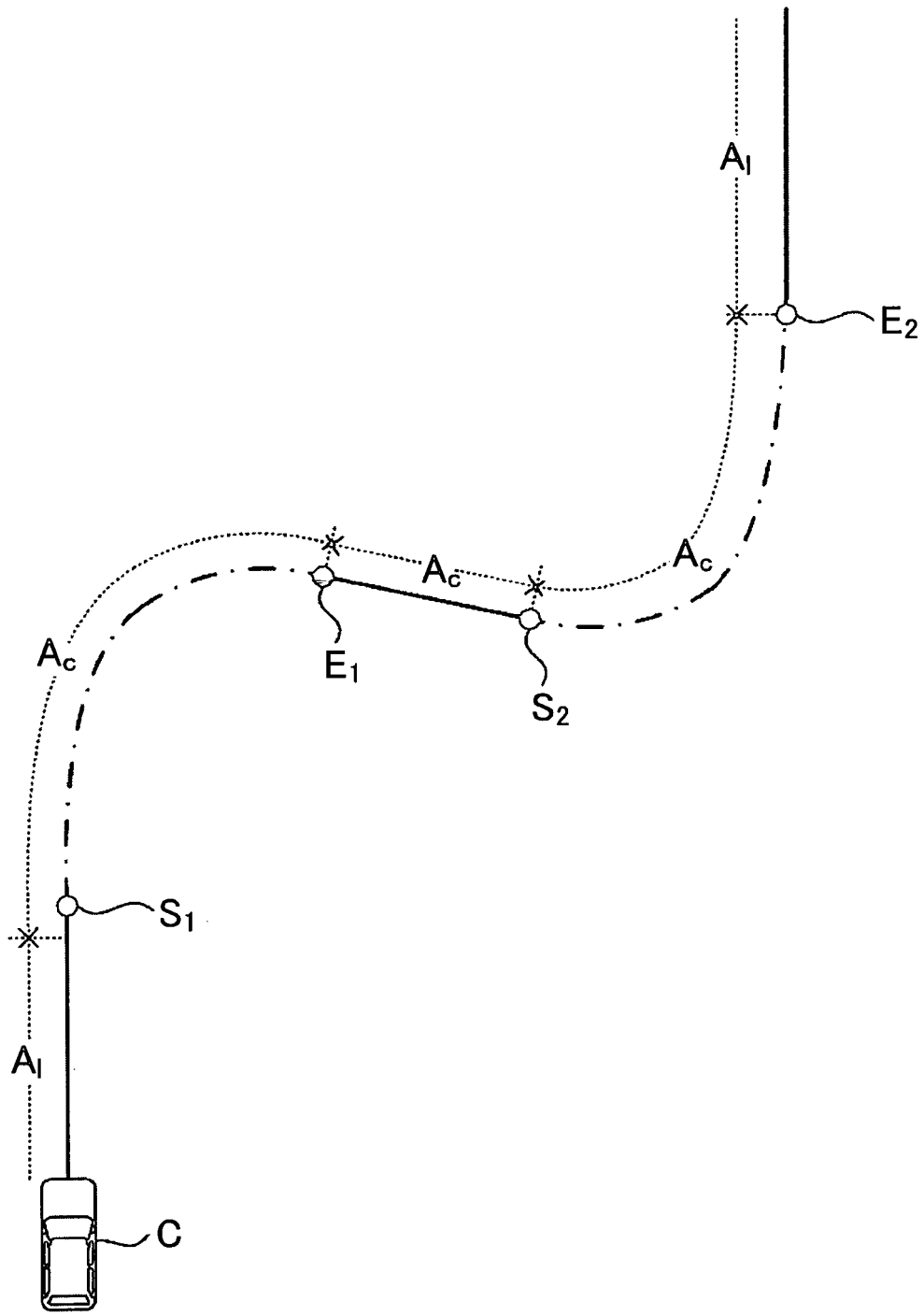
FIG. 3 is a diagram showing an example of a vehicle driving curves.

FIG. 3 is an explanatory view for explaining the following example. In FIG. 3, a solid line indicates a straight section on a road, and a chain-dashed line indicates a curve section on the road. Further, in the example shown in FIG. 3, the start position of the closest curve section existing ahead of the vehicle C is shown by S1, and the end position thereof is shown by E1. The start position of the next curve section from the closest curve section is shown by S2, and the end position thereof is shown by E2.

As shown in FIG. 3, when the vehicle C is traveling in a straight section, the threshold for starting the control of the roll stiffness is A1. In this state, when the stabilizer control method shown in FIG. 2 begins, first the navigation program 21 determines in the above-described matching processing whether a traveling trace of the vehicle is matching with any sequence of nodes and/or shape interpolation points (step S100). When it is not determined as matching (step S100=NO), the stabilizer control method is terminated.

In step S100, when it is determined as matching (step S100=YES), the curve section information obtaining unit 21b refers to the map information 30a and obtains information indicating curve sections existing in a predetermined range ahead of the vehicle (step S105). Next, the navigation program 21 determines whether the vehicle is traveling based on information indicating the vehicle speed outputted by the vehicle speed sensor 42 (step S110). When it is not determined that the vehicle is traveling (step S110=NO), the stabilizer control method is terminated.

In step S110, when it is determined that the vehicle is traveling (step S110=YES), the curve section information obtaining unit 21b determines whether the start position of a curve section exists ahead of the vehicle based on the information indicating curve sections obtained in the step S105 (step S115). Specifically, the curve section information obtaining unit 21b compares the current position of the vehicle and the start position of a curve section existing ahead of the vehicle, and determines whether the distance between the both is equal to or shorter than a predetermined distance L1 (for example, 100 m). When it is not determined in step S115 that the start position of a curve section exists ahead of the vehicle (step S115=NO), the stabilizer control method is terminated.

On the other hand, when it is determined in step S115 that the start position of a curve section exists ahead of the vehicle (step S115=YES), the stabilizer control unit 21c obtains the predicted arrival time to the start position based on the vehicle speed of the vehicle and the distance L1 from the current position of the vehicle to the start position of the curve section, and determines whether the predicted arrival time is equal to or shorter than a predetermined threshold T (for example, 1.5 seconds) (step S120). In step S120, when it is not determined that the predicted arrival time from the vehicle to the start position of the curve section is equal to or shorter than the predetermined threshold T (step S120=NO), the determination in this step S120 is repeated.

On the other hand, when it is determined in step S120 that the predicted arrival time from the vehicle to the start point of the curve section is equal to or shorter than the threshold T (step S120=YES), the stabilizer control unit 21c outputs a control signal to the stabilizer 43 to set the threshold when controlling the roll stiffness in the stabilizer 43 to Ac (step S125).

In the example shown in FIG. 3, the threshold is changed from A1 to Ac before the vehicle reaches the start position S1 of the curve section. Therefore, in the curve section, the control of the roll stiffness in the stabilizer 43 is performed even in a state that lateral acceleration equal to or larger than the threshold Ac and equal to or smaller than the threshold A1 operates on the vehicle, and the control of the roll stiffness can be performed appropriately in the curve section. Further, in a section other than a curve section (in the example shown in FIG. 3, the section before the start position S1 in which the threshold is A1), the roll stiffness is controlled according to the lateral acceleration that is larger than in the curve section, and the roll stiffness will not increase inappropriately according to the lateral acceleration equal to or larger than the threshold Ac and equal to or smaller than the threshold A1.

Next, the stabilizer control unit 21c determines whether the vehicle reaches the end position of the curve section (step S130). Specifically, the stabilizer control unit 21c obtains information indicating the end position of the curve section and the information indicating the current position of the vehicle, and determines whether the current position of the vehicle matches the end position of the curve section. When it is not determined in step S130 that the vehicle has reached the end position of the curve section (step S130=NO), step S130 is repeated.

When it is determined in step S130 that the vehicle reaches the end position of the curve section (step S130=YES), the stabilizer control unit 21c further determines whether the distance to the start position of the next curve section is equal to or shorter than a predetermined distance L2 (for example, 50 m) (step S135). Specifically, the stabilizer control unit 21c determines, based on the information indicating curve sections obtained by the curve section information obtaining unit 21b and the information indicating the current position of the vehicle, whether the next curve section further exists ahead of the curve section passed by the vehicle, and whether the distance from the current position of the vehicle to the start position of the next curve section is equal to or shorter than the predetermined distance L2.

In step S135, when it is not determined that the distance to the start position of the next curve section is equal to or shorter than the predetermined distance L2 (step S135=NO), it is assumed that the next curve section is not approaching ahead of the vehicle, and the stabilizer control unit 21c sets the threshold when controlling the roll stiffness in the stabilizer 43 to A1 (step S140).

On the other hand, in step S135, when it is determined that the distance to the start position of the next curve section is equal to or shorter than the predetermined distance L2 (step S135=YES), it is assumed that the next curve section is approaching ahead of the vehicle, and the stabilizer control unit 21c keeps the threshold set to Ac (step S145).

Then, the stabilizer control unit 21c obtains the information indicating curve sections obtained by the curve section information obtaining unit 21b and repeats the processing of step S130 and thereafter. That is, the processing to determine whether the vehicle has reached the end position of the next curve section is performed, and the processing to set the threshold is repeated.

In the example shown in FIG. 3, there is shown an example of the case where the distance between the end position E1 of the curve section and the start position S2 of the next curve section is equal to or shorter than the predetermined distance L2, and on this road, step S145 is implemented after passing through step S135. Therefore, in this example, the threshold to start the control of the roll stiffness is kept to Ac as it is also between the end position E1 of the curve section and the start position S2 of the next curve.

Further, while the threshold for starting the control of the roll stiffness is kept to Ac, the vehicle C travels from the start position S2 of the curve section to the end position E2 thereof. When the vehicle C reaches the end position E2, the threshold is returned to A1 of the normal state in step S140 after passing through the determination in S130 and S135. Therefore, after the end position E2 of the curve section, the threshold for starting the control of the roll stiffness is set to A1. By the above processing, in the vehicle C, the state that the sensitivity to the lateral acceleration is high is kept also when curve sections continue at short intervals, and the roll stiffness can be controlled to securely prevent rolling in the curve sections.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, other various examples can be adopted as long as information indicating curve sections is obtained, and in the curve section, a smaller threshold than in a section other than the curve section is set for the lateral acceleration. For example, the sensor for obtaining the lateral acceleration is not limited to the acceleration sensor or the like for obtaining the lateral acceleration directly. The lateral acceleration may be obtained indirectly by estimation based on detection values from a steering angle sensor and a vehicle speed sensor or a detection value from a sensor or the like indicating behavior of the suspensions. It is thus possible to adopt various arrangements.

The curve section information obtaining unit 21*b* is capable of obtaining the information indicating curve sections where the curvature is equal to a predetermined value on the road on which the vehicle is traveling. Therefore, an arrangement to obtain information indicating the start position, the end position, and the like of a curve section from a storage medium may be adopted. Further, an arrangement to record information indicating positions of nodes and shape interpolation points in advance in a storage medium, and obtain the information indicating curve sections by identifying the road shape from a sequence of the nodes and shape interpolation points, may be adopted. As a matter of course, the information indicating curve sections may be included in the map information 30*a* as described above, or may be recorded as information different from the map information 30*a*.

Further, as described above, in the arrangement to keep in continuous curve sections the threshold Ac for the curve sections, various arrangements can be adopted for an arrangement to obtain the information indicating continuous curve sections. Information regarding curve sections existing in a predetermined range from the vehicle may be obtained, or information regarding curve sections existing in a predetermined range from the curve section closest to the vehicle may be obtained.

Furthermore, an arrangement to decide the roll stiffness distribution to the stabilizers provided in the front part and the rear part of the vehicle respectively as described above based on gradient information may be obtained. Specifically, in normal stabilizer control, the roll stiffness distribution is decided depending on the vehicle speed. However, in the arrangement to decide the roll stiffness distribution depending only on the vehicle speed, it is possible that, on a downward or upward slope, the steering characteristic becomes an under steering or over steering characteristic. For example, in a curve section having a downward slope, it is possible that the steering characteristic becomes the over steering characteristic, and thereby the vehicle becomes unstable.

Accordingly, besides the information indicating curve sections on the road from the map information 30*a*, gradient information of the road surface is further obtained, and the stabilizer control unit 21*c* changes the distribution of the front and rear stabilizer control amounts according to the obtained gradient information. Specifically, the distribution of a control amount to the stabilizer for the front wheels is increased in a downward slope (stiffening the stabilizer), to thereby suppress the over steering characteristic. Accordingly, the steering characteristic on a downward or upward slope can be stabilized, and the safety of the vehicle improves.

What is claimed is:

1. A stabilizer control device for a vehicle, comprising:
   a controller that is specifically configured to:
      obtain information indicating lateral acceleration operating on the vehicle;
      obtain information indicating a curve section existing in a traveling direction of the vehicle;
      control roll stiffness by a stabilizer mounted on the vehicle based on the obtained lateral acceleration information by setting a lateral acceleration threshold at a first value in the curve section and a second value in a section other than the curve section respectively, the first value being smaller than the second value;
      control the roll stiffness when the lateral acceleration is equal to or larger than the first value when the vehicle is traveling in the curve section and equal to or larger than the second value when the vehicle is traveling in the section other than the curve section;
      obtain a predicted arrival time for the vehicle to arrive at a start position of the curve section based on a speed of the vehicle and a current position of the vehicle; and
      set the lateral acceleration threshold to the first value when the predicted arrival time is not longer than a predetermined time.

2. The stabilizer control device according to claim 1, wherein the controller is specifically configured to obtain information indicating the curve section by referring to map information recorded in a storage medium.

3. The stabilizer control device according to claim 2, further comprising the storage medium.

4. The stabilizer control device according to claim 1, wherein the controller is specifically configured to:
   obtain information indicating two curve sections existing in the traveling direction of the vehicle, and
   obtain a distance between curve sections based on the information indicating the two curve sections;
   determine if the distance between the two curve sections is less than a predetermined threshold; and
   if the distance between the two curve sections is less than a predetermined threshold, keep the lateral acceleration threshold set at the first value in the two curve sections and between the two curve sections.

5. A navigation apparatus comprising the stabilizer control device of claim 1.

6. The stabilizer control device according to claim 1, wherein the controller is specifically configured to control the roll stiffness to be higher as the acceleration in the lateral direction gets larger.

7. A stabilizer control method, comprising:
   obtaining information indicating lateral acceleration operating on a vehicle;
   obtaining information indicating a curve section existing in a traveling direction of the vehicle;
   controlling, with a controller, roll stiffness by a stabilizer mounted on the vehicle based on the obtained lateral acceleration information by setting a lateral acceleration threshold at a first value in the curve section and a second value in a section other than the curve section respectively, the first value being smaller than the second value;
   controlling, with a controller, the roll stiffness when the lateral acceleration is equal to or larger than the first value when the vehicle is traveling in the curve section and equal to or larger than the second value when the vehicle is traveling in the section other than the curve section;
   obtaining a predicted arrival time for the vehicle to arrive at a start position of the curve section based on a speed of the vehicle and a current position of the vehicle; and
   controlling the lateral acceleration threshold to be the first value when the predicted arrival time is not longer than a predetermined time.

8. The stabilizer control method according to claim 7, further comprising obtaining information indicating the curve section by referring to map information recorded in a storage medium.

9. The stabilizer control method according to claim 7, further comprising:

obtaining information indicating two curve sections existing in a traveling direction of the vehicle, and obtaining a distance between curve sections based on the information indicating the two curve sections;

determining if the distance between the two curve sections is less than a predetermined threshold; and keeping the lateral acceleration threshold set at the first value in the two curve sections and between the two curve sections when the distance between the two curve sections is less than a predetermined threshold.

10. The stabilizer control method according to claim 7, wherein the method is implemented by a navigation apparatus.

11. The stabilizer control method according to claim 7, further comprising controlling the roll stiffness to be higher as the acceleration in the lateral direction gets larger.

12. A non-transitory computer-readable storage medium storing a computer-executable program usable to control a stabilizer lateral, the program comprising:

instructions for obtaining information indicating lateral acceleration operating on the vehicle;

instructions for obtaining information indicating a curve section existing in a traveling direction of the vehicle;

instructions for controlling roll stiffness by a stabilizer mounted on the vehicle based on the obtained lateral acceleration information by setting a lateral acceleration threshold at a first value in the curve section and a second value in a section other than the curve section respectively, the first value being smaller than the second value;

instructions for controlling the roll stiffness when the lateral acceleration is equal to or larger than the first value when the vehicle is traveling in the curve section and equal to or larger than the second value when the vehicle is traveling in the section other than the curve section;

instructions for obtaining a predicted arrival time for the vehicle to arrive at a start position of the curve section based on a speed of the vehicle and a current position of the vehicle; and instructions for controlling the lateral acceleration threshold to be the first value when the predicted arrival time is not longer than a predetermined time.

\* \* \* \* \*